US007439697B2

(12) United States Patent  
Miyazaki et al.

(10) Patent No.: US 7,439,697 B2  
(45) Date of Patent: Oct. 21, 2008

(54) MOTOR DRIVING DEVICE AND AUTOMOBILE USING THE SAME

(75) Inventors: Hideki Miyazaki, Hitachi (JP); Satoru Kaneko, Naka (JP)

(73) Assignee: Hitachi Ltd., Tokyo (JP)

( * ) Notice: Subject to any disclaimer, the term of this patent is extended or adjusted under 35 U.S.C. 154(b) by 136 days.

(21) Appl. No.: 11/605,218

(22) Filed: Nov. 29, 2006

(65) Prior Publication Data

US 2007/0120520 A1 May 31, 2007

(30) Foreign Application Priority Data

Nov. 30, 2005 (JP) ............................. 2005-346048

(51) Int. Cl.
*H02P 6/00* (2006.01)
*H02K 7/20* (2006.01)

(52) U.S. Cl. ............................ 318/400.41; 318/400.26; 318/724; 310/112

(58) Field of Classification Search ................. 318/700, 318/400.01, 400.02, 400.09, 400.15, 400.26, 318/400.3, 400.38, 400.41, 720–724; 310/112, 310/152

See application file for complete search history.

(56) References Cited

U.S. PATENT DOCUMENTS 3,919,619 A * 11/1975 Corry ........................... 363/71  
4,426,611 A * 1/1984 Espelage et al. ............. 318/803  
4,814,964 A * 3/1989 Schauder et al. .............. 363/37  
5,705,909 A * 1/1998 Rajashekara ................ 318/801  
6,158,553 A * 12/2000 Oshima et al. .............. 187/293  
6,242,884 B1 * 6/2001 Lipo et al. ................... 318/808

FOREIGN PATENT DOCUMENTS

JP 7-115704 A 5/1995

OTHER PUBLICATIONS

Kusaka, et al., *Novel Power Conversion System for Cost Reduction in Vehicles with 42V/14V Power Supply*, SAE 2003-01-0307.

* cited by examiner

*Primary Examiner*—Bentsu Ro  
(74) *Attorney, Agent, or Firm*—Crowell & Moring LLP (57) ABSTRACT

As a boosting-type motor driving device using no reactor, a motor driving device capable of controlling boosting operation and motor driving at the same time is provided, and an automobile using the motor driving device is also provided. The motor driving device is used for driving a motor with a double-winding structure having a first set of three-phase windings and a second set of three-phase winding which are wound over a stator, and includes first and second inverters, which are connected respectively to the first set of three-phase windings and the second set of three-phase windings, thereby controlling the first and second inverters to control a driving force of the motor with the double-winding structure. The first and second inverters have positive and negative terminals which are connected respectively in common to a high-voltage battery. The motor driving device further includes a first switch unit connected between the positive terminals of the first and second inverters connected in common and a positive pole of the high-voltage battery, and a second switch unit connected between a neutral point of the second set of three-phase windings and the positive pole of the high-voltage battery.

8 Claims, 7 Drawing Sheets

MOTOR DRIVING DEVICE AND AUTOMOBILE USING THE SAME

BACKGROUND OF THE INVENTION

1. Field of the Invention

The present invention relates to a motor driving device suitably used to assist driving torque of an automobile by using a motor as in the case of a hybrid car, and to an automobile using the motor driving device. More particularly, the present invention relates to a motor driving device suitable for driving a motor with a doubling winding structure, and to an automobile using the motor driving device.

2. Description of the Related Art

Recently, in the industrial field of automobiles, importance has been laid in improving fuel economy and cleaning exhaust gas from the viewpoint of adaptation for environmental issues, and attention has been focused on a hybrid car using a motor to assist torque in a speed range where fuel economy efficiency of an engine is not so high. A motor is superior in torque response to an engine and is expected to not only improve fuel economy, but also to serve as a useful component in running control, such as VDC (Vehicle Dynamic Control), in future. The motor is constituted by a permanent-magnet type synchronous motor with high efficiency and is used at high speed range in which a maximum rotation speed exceeds 10,000 rpm. In the motor, an induced voltage (also called counter electromotive voltage) is generated in proportion to the rotation speed, and a current is caused to flow due to the difference between the power supply voltage and the induced voltage. At the high speed in excess of 10,000 rpm, it becomes hard to flow a current due to an influence of the induced voltage. Therefore, a method of suppressing the induced voltage by the so-called field weakening control is employed. Lately, a method of boosting a battery voltage is also employed.

The method of boosting the battery voltage is performed by providing a boosting converter between a battery and an inverter, and by repeating operations of causing a battery current to temporarily flow through a reactor to be stored therein as electromagnetic energy, and supplying electric power to the inverter with the reactor used a current source. However, the reactor adaptable for an output in excess of several tens kW is increased in both size and weight. Accordingly, there is a demand for a boosting method which requires a smaller reactor or uses no reactor.

As a first known example of the boosting method using no reactor, Patent Document 1 (JP-A-7-115704), for example, discloses a method of using a double-winding motor and two inverters. According to the disclosed method, a high-voltage winding and a low-voltage winding are wound around a motor stator to constitute one kind of transformer. The motor itself is driven by a first inverter connected to the high-voltage winding. When the voltage of a low-voltage power supply is boosted, the stator is excited by a second inverter connected to the low-voltage winding, and a current is rectified by the first inverter and is charged in a high-voltage power supply.

As a second known example, there is a method described in Non-Patent Document 1 ("Novel Power Conversion System for Cost Reduction in Vehicles with 42V/14V Power Supply" (SAE 2003-01-0307)). According to the described method, a motor has a structure of a single high-voltage winding, and a low-voltage power supply is connected to a neutral point of the motor. A motor winding is used instead of a reactor by utilizing the operation that an inverter connected to a high-voltage winding is turned on and off with PWM (Pulse Width Modulation) control.

SUMMARY OF THE INVENTION

However, the first known example is intended to boost the voltage of the low-voltage power supply by using the second inverter when a sufficient voltage is not held in the high-voltage power supply. In the boosting operation, therefore, a switching device in the first inverter turned off, thus causing the first inverter to operate as a rectification circuit, and the function of driving the motor is stopped. In other words, the first known example is not suitable for the case where the motor is driven in the high speed range while boosting the voltage, as in a hybrid car.

On the other hand, in the second known example, because a DC component flowing via the neutral point is superimposed on three-phase motor currents, boosting operation from the low-voltage power supply to the high-voltage power supply can be performed by using the DC component at the same time as continuing driving of the motor. However, since both the AC and DC current components flow trough a power device in the inverter, a loss of the power device is abruptly increased as a DC current used for the boosting operation is increased with respect to the amplitude of an AC current, thus raising a problem in point of whether the motor can be held within a thermally allowable level. Also, if the waveform of the AC current is distorted by superimposition of the DC current, other problems may occur in that electromagnetic noisy sounds are generated from the motor and electromagnetic noise is caused by the PWM control. Further, because the boosting operation and the motor driving are controlled at the same time by one inverter, an increase of a maximum current resulting from the superimposition of the DC current may cause breakdown of the power device due to a surge voltage.

An object of the present invention is to provide, as a boosting-type motor driving device using no reactor, a motor driving device which can control boosting operation and motor driving at the same time, and an automobile using the motor driving device.

(1) To achieve the above object, the present invention provides a motor driving device for driving a motor with a double-winding structure having a first set of three-phase windings and a second set of three-phase windings which are wound over a stator, the motor driving device including first and second inverters which are connected respectively to the first and second sets of three-phase windings, and controlling the first and second inverters to control a driving force of the motor with the double-winding structure, wherein the first and second inverters have positive and negative terminals which are connected respectively in common to a high-voltage battery, and the motor driving device further includes a first switch unit connected between the positive terminals of the first and second inverters connected in common and a positive pole of the high-voltage battery; and a second switch unit connected between a neutral point of the second set of three-phase windings and the positive pole of the high-voltage battery.

With those features, in a first mode, the first and second inverters are operated in parallel, whereby the motor currents can supplied in an allocated manner so as to reduce loss. In a second mode, the second inverter is controlled to flow a DC current to the motor windings from the high-voltage battery via the neutral point such that a battery voltage is increased by boosting operation while using the motor windings as a reactor. As a result, the motor can be continuously driven without problems, and the boosting operation and the motor driving can be controlled at the same time.

(2) In above (1), preferably, the motor driving device further comprises a control unit for commanding the first and second inverters to output AC currents in the same phase in a first mode in which the first switch unit is turned on and the second switch unit is turned off, and commanding the first inverter to output a desired AC current, commanding the second inverter to flow a DC current via the neutral point, and for commanding the first and second inverters to superimpose AC currents, which are changed in phase for compensation, in a second mode in which the first switch unit is turned off and the second switch unit is turned on.

With those features, a part of the motor currents for generating a rotating magnetic field is supplied from the second inverter, whereby the loss generated in the first inverter can be reduced.

(3) In above (2), preferably, the control unit performs vector control for each of the first and second inverters such that, in the first mode, q- and d-axis AC currents outputted from the first and second inverters are in the same phase, and that, in the second mode, the phase of a q-axis AC current outputted from the first inverter is changed by $-90°×n$ (n is 0 or 1) for compensation and the phase of a q-axis AC current outputted from the second inverter is changed by $+90°×n$ (n is 0 or 1) for compensation.

With those features, the second inverter can be controlled based on the vector control over an entire period of the first mode and the second mode, and transition from the first mode to the second mode can be performed just by changing the phase of the q-axis current and superimposing a DC component that does not affect the vector control.

(4) In above (2), preferably, the motor driving device further comprises current sensors for detecting respective output currents of the first and second inverters, and the control unit changes the amplitude and phase of the AC current outputted from the second inverter in the second mode such that a difference between effective values of the currents outputted from the first and second inverters, which are detected by the current sensors, is reduced.

With those features, it is possible to make the losses in the first and second inverters as even as possible, to moderate concentration of heat, and to realize an increase in capacity of the motor.

(5) In above (2), preferably, the control unit controls the first and second inverters in a pulse width modulation method such that pulse-like voltages outputted from the first and second inverters are reversed in phase.

With those features, electromagnetic noises generated in both the first and second inverters can be canceled each other, thus resulting in small electromagnetic noise.

(6) In above (2), preferably, when an abnormal condition of one of the first and second inverters in detected, the control unit turns on the first switch unit, turned off the second switch unit, and continues to drive the motor by using the other sound inverter.

With those features, the driving of the motor can be continued by using the other sound inverter.

(7) Also, to achieve the above object, the present invention provides a motor driving device for driving a motor with a double-winding structure having a first set of three-phase windings and a second set of three-phase windings which are wound over a stator, the motor driving device including first and second inverters which are connected respectively to the first and second sets of three-phase windings, and controlling the first and second inverters to control a driving force of the motor with the double-winding structure, wherein the first and second inverters have positive and negative terminals which are connected respectively in common to a high-voltage battery, and the motor driving device further includes a first switch unit connected between the positive terminals of the first and second inverters connected in common and a positive pole of the high-voltage battery; a second switch unit connected between a neutral point of the second set of three-phase windings and the positive pole of the high-voltage battery; and a control unit for commanding the first and second inverters to output AC currents in the same phase in a first mode in which the first switch unit is turned on and the second switch unit is turned off, and for commanding the first inverter to output a desired AC current, commanding the second inverter to flow a DC current via the neutral point, and commanding the first and second inverters to superimpose AC currents, which are changed in phase for compensation, in a second mode in which the first switch unit is turned off and the second switch unit is turned on.

With those features, in the first mode, the first and second inverters are operated in parallel, whereby the motor currents can supplied in an allocated manner so as to reduce loss. In the second mode, the second inverter is controlled to flow a DC current to the motor windings from the high-voltage battery via the neutral point such that a battery voltage is increased by boosting operation while using the motor windings as a reactor. As a result, the motor can be continuously driven without problems, and the boosting operation and the motor driving can be controlled at the same time. In addition, a part of the motor currents for generating a rotating magnetic field is supplied from the second inverter, whereby the loss generated in the first inverter can be reduced.

(8) Further, to achieve the above object, the present invention provides an automobile comprising a motor with a double-winding structure having a first set of three-phase windings and a second set of three-phase winding which are wound over a stator; and a motor driving device including first and second inverters which are connected respectively to the first and second sets of three-phase windings, and controlling the first and second inverters to control a driving force of the motor with the double-winding structure, wherein the first and second inverters have positive and negative terminals which are connected respectively in common to a high-voltage battery, the motor driving device further includes a first switch unit connected between the positive terminals of the first and second inverters connected in common and a positive pole of the high-voltage battery; and a second switch unit connected between a neutral point of the second set of three-phase windings and the positive pole of the high-voltage battery, and the motor is driven in a first mode when a speed of the automobile is low, and is driven a second mode when a speed of the automobile is high.

Thus, according to the present invention, in the boosting-type motor driving device using no reactor, the boosting operation and the motor driving can be controlled at the same time.

DESCRIPTION OF THE PREFERRED EMBODIMENTS

The construction and operation of a double-winding motor driving device according to one embodiment of the present invention will be described below with reference to FIGS. 1-13.

The construction of the double-winding motor driving device according to the one embodiment of the present invention is first described with reference to FIG. 1.

Figure 1:
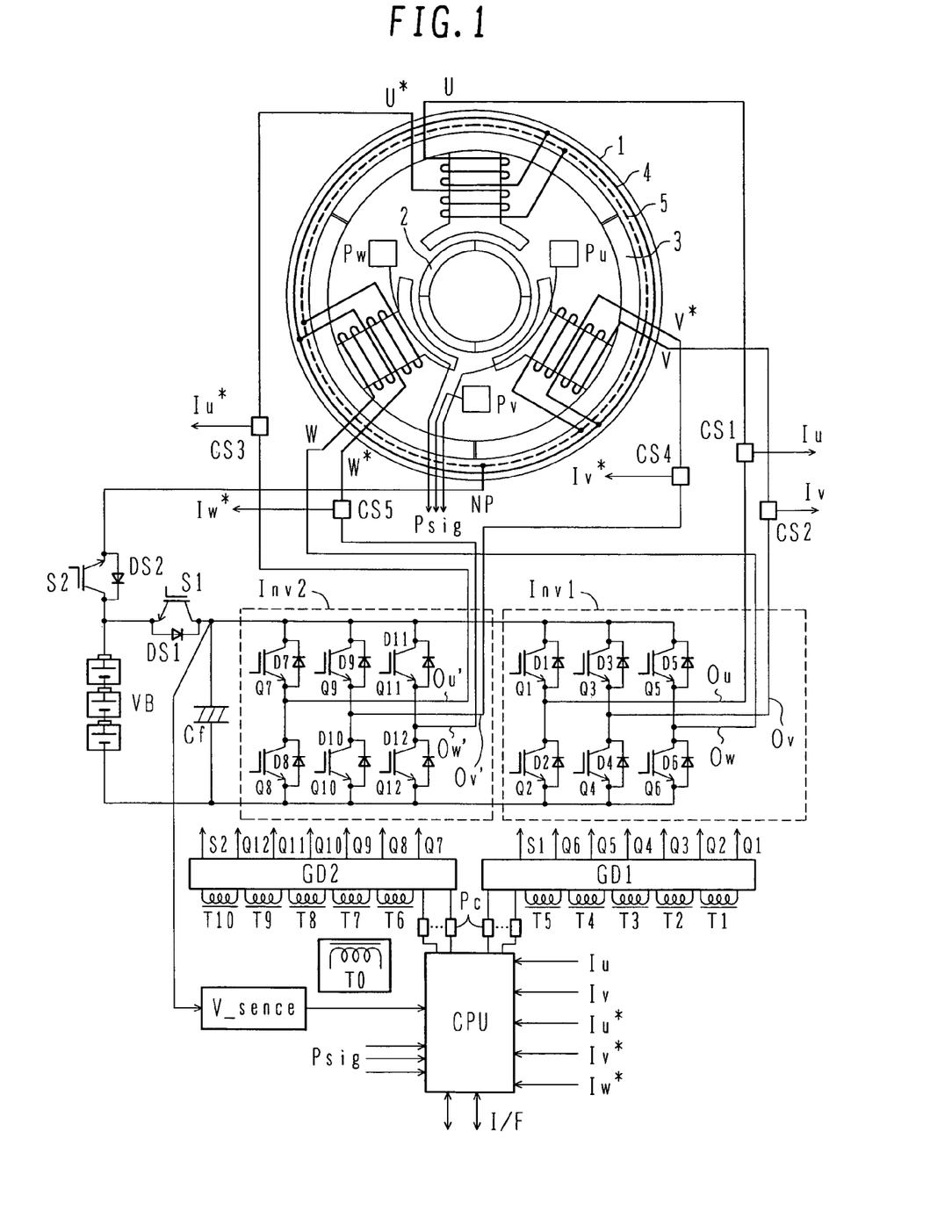
FIG. 1 is a circuit diagram showing the overall construction of a double-winding motor driving device according to one embodiment of the present invention.

FIG. 1 is a circuit diagram showing the overall construction of the double-winding motor driving device according to the one embodiment of the present invention.

A motor 1 is a three-phase permanent-magnet synchronous motor. The motor 1 comprises a rotor 2 including permanent magnets built therein, and a stator 3 made of a magnetic material, e.g., a silicon steel plate. Pairs of double windings U-U*, V-V*, and W-W* are wound respectively over three teeth of the stator 3. While those windings are shown as a concentrated winding structure in the simplified form, the winding structure is not limited to the illustrated one, and other suitable structures including distributed winding are also usable. Further, the shapes of the teeth and slots are not limited to the illustrated ones and can be modified to other suitable shapes. In other words, the structure closely related to the present invention is only that three-phase windings are wound double over each tooth, and other structures of the rotor and the stator may be suitably modified to other ones than those shown in FIG. 1.

The windings U, V and W not affixed with a symbol * are combined with each other to constitute a first set of three-phase windings, and the windings U*, V* and W* affixed with a symbol * are combined with each other to constitute a second set of three-phase windings. Respective one ends of the windings U, V and W are connected in common as indicated by a solid line 4, and the solid line 4 represents a neutral-point connecting line for the first set of three-phase windings. Similarly, respective one ends of the windings U*, V* and W* are connected in common as indicated by a broken line 5, and the broken line 5 represents a neutral-point connecting line for the second set of three-phase windings. A neutral point NP of the second set of three-phase windings is extended to the outside of the motor by a wire and is connected to a positive pole of a high-voltage battery VB through a switch unit S2. Also, respective other ends of the windings U, V and W and respective other ends of the windings U*, V* and W*, which differ from the neutral points, are extended to the outside of the motor by wires and are connected to inverters as described later. The motor 1 includes pole position sensors Pu, Pv and Pw for detecting pole positions of the rotor 2. The pole position sensors Pu, Pv and Pw can be constructed by three independent devices, such as linear Hall ICs, or by the so-called resolver which is fixed in concentric relation to the rotor.

The construction of the inverters, i.e., the essential feature of the present invention, will be described below. As shown in FIG. 1, two first and second three-phase inverters Inv1 and Inv2 are employed in this embodiment. Positive poles and negative poles of the three-phase inverters Inv1 and Inv2 are connected respectively in common per pole. The positive pole common to the three-phase inverter Inv1 and the three-phase inverter Inv2 is connected to the positive pole of the high-voltage battery VB through a switch unit S1. Also, the negative pole common to the three-phase inverter Inv1 and the three-phase inverter Inv2 is directly connected to a negative pole of the high-voltage battery VB. The first inverter Inv1 has output terminals Ou, Ov and Ow which are connected respectively to the first windings U, V and W. Similarly, the second inverter Inv2 has output terminals Ou*, Ov* and Ow* which are connected respectively to the second windings U*, V* and W*.

As shown in FIG. 1, the switch units S1 and S2 are each constituted by an IGBT and a diode which are connected to each other in antiparallel relation. When a gate signal is applied to the switch unit S1, the IGBT is turned on, thus allowing a current to flow in a direction from a positive pole terminal common to both the inverters Inv1 and Inv2 toward the high-voltage battery VB. A diode DS1 of the switch unit S1 allows a current to flow regardless of the gate signal applied to the switch unit S1 when the voltage of the high-voltage battery VB is higher than the voltage at the positive pole terminal common to both the inverters Inv1 and Inv2. Similarly, when a gate signal is applied to the switch unit S2, the IGBT is turned on, thus allowing a current to flow in a direction from the high-voltage battery VB toward the neutral point NP of the second set of three-phase windings. A diode DS2 of the switch unit S2 allows a current to flow regardless of the gate signal applied to the switch unit S2 when the voltage of the neutral point NP is higher than the voltage of the high-voltage battery VB.

Current sensors CS1, CS2, CS3, CS4 and CS5 for detecting currents in the windings will be described below. The current sensors CS1 and CS2 are sensors for detecting AC currents Iu and Iv flowing through the windings U and V, respectively. Those current sensors can be constituted by general current transformers, or they may be each other suitable type of current sensor which is able to detect an AC current. Because the windings U, V and W are not extracted from the neutral point to the outside of the motor, a total value of three-phase motor currents at the neutral point becomes zero. Therefore, it is not required to detect all the three-phase motor currents. Hence only two-phase currents are detected in the embodiment shown in FIG. 1. On the other hand, the current sensors CS3, CS4 and CS5 are sensors for detecting AC currents Iu*, Iv* and Iw* flowing through the windings U*, V* and W*, respectively. Those current sensors can be constituted by general current transformers, or they may be each other suitable type of current sensor which is able to detect an AC current and a DC current. Because a current is caused to flow to the windings U*, V* and W* through the neutral point NP, a total value of three-phase motor currents at the neutral point NP does not become zero. Therefore, it is required to detect all the three-phase motor currents.

A control circuit for the inverters Inv1 and Inv2 will be described below. The construction of the inverter Inv1 is first described. A parallel circuit of an IGBT Q1 and a diode D1, which constitute a U-phase upper arm, and a parallel circuit of an IGBT Q2 and a diode D2, which constitute a U-phase lower arm, are connected in series. A U-phase output Ou is outputted to the U-phase winding U from a junction between the U-phase upper arm and the U-phase lower arm. A parallel circuit of an IGBT Q3 and a diode D3, which constitute a V-phase upper arm, and a parallel circuit of an IGBT Q4 and a diode D4, which constitute a V-phase lower arm, are connected in series. A V-phase output Ov is outputted to the V-phase winding V from a junction between the V-phase upper arm and the V-phase lower arm. A parallel circuit of an IGBT Q5 and a diode D5, which constitute a W-phase upper arm, and a parallel circuit of an IGBT Q6 and a diode D6, which constitute a W-phase lower arm, are connected in series. A W-phase output Ow is outputted to the W-phase winding W from a junction between the W-phase upper arm and the W-phase lower arm.

The construction of the inverter Inv2 is next described. A parallel circuit of an IGBT Q7 and a diode D7, which constitute a U*-phase upper arm, and a parallel circuit of an IGBT Q8 and a diode D8, which constitute a U*-phase lower arm, are connected in series. A U*-phase output Ou* is outputted to the U*-phase winding U* from a junction between the U*-phase upper arm and the U*-phase lower arm. A parallel circuit of an IGBT Q9 and a diode D9, which constitute a V*-phase upper arm, and a parallel circuit of an IGBT Q10 and a diode D10, which constitute a V*-phase lower arm, are connected in series. A V*-phase output Ov* is outputted to the V*-phase winding V* from a junction between the V*-phase upper arm and the V*-phase lower arm. A parallel circuit of an IGBT Q11 and a diode D11, which constitute a W*-phase upper arm, and a parallel circuit of an IGBT Q12 and a diode D12, which constitute a W*-phase lower arm, are connected in series. A W*-phase output Ow* is outputted to the W*-phase winding W* from a junction between the W*-phase upper arm and the W*-phase lower arm.

The operation will be described below. Gate signals for the switching devices (IGBTs) Q1, ..., Q6 of the inverter Inv1 and for the switch unit (IGBT) S1 are applied from a driver board GD1. Also, gate signals for the switching devices (IGBTs) Q7, ..., Q12 of the inverter Inv2 and for the switch unit (IGBT) S2 are applied from a driver board GD2. Drive signals for the driver boards GD1 and GD2 are applied from a microcomputer CPU via isolation signal transmission means, e.g., photocoupler Pc. Secondary sides T1, T2 and T3 of a transformer serve as control power supplies for the switching devices Q1, Q3 and Q5 in the upper arm of the inverter Inv1. A secondary side T4 of the transformer serves as a control power supply common to the switching devices Q2, Q4 and Q6 in the lower arm of the inverter Inv1. Further, a secondary side T5 of the transformer serves as a control power supply for the switch unit S1. Similarly, secondary sides T6, T7 and T8 of the transformer serve as control power supplies for the switching devices Q7, Q9 and Q11 in the upper arm of the inverter Inv2. A secondary side T9 of the transformer serves as a control power supply common to the switching devices Q8, Q10 and Q12 in the lower arm of the inverter Inv2. Further, a secondary side T10 of the transformer serves as a control power supply for the switch unit S2. A primary side of the transformer common to the secondary sides T1, ..., T10 is T0.

Sensor signals inputted to the microcomputer CPU include a rotor pole-position detected signal Psig, output signals Iu, Iv, Iu*, Iv* and Iw* of the current sensors, and an output of a voltage sensor V_sense for detecting the voltage of a capacitor Cf and changing a gain in the course of transmission while keeping a detected signal in an insulated state. Further, a torque command for the motor 1 and other signals are also applied to the microcomputer CPU via a communication unit I/F between the microcomputer CPU and a higher-level control system. Conversely, a signal informing the occurrence of an abnormal condition, etc. is outputted from the microcomputer CPU to the higher-level control system.

In this embodiment, the first inverter Inv1 is used for driving the motor 1 over an entire range. On the other hand, the second inverter Inv2 is used for driving the motor 1 with operation in the same phase as that of the first inverter Inv1 in a low speed range (first mode) and used as a boosting device for boosting the voltage of the high-voltage battery VB through the neutral point NP, and charging the boosted voltage in the capacitor Cf in a high speed range (second mode).

The operation of the two inverters Inv1 and Inv2 used in the double-winding motor driving device according to this embodiment will be described below with reference to FIGS. 2 to 4.

Figure 2:
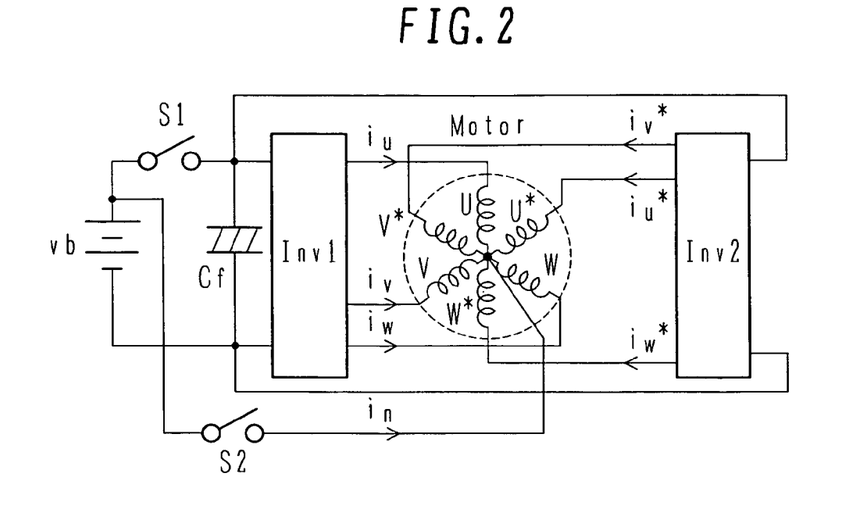
FIG. 2 is an explanatory view for explaining flows of currents in a principal part of the double-winding motor driving device according to the one embodiment of the present invention.

FIG. 2 is an explanatory view for explaining flows of currents in a principal part of the double-winding motor driving device according to the one embodiment of the present invention. FIG. 3 is a graph showing current vectors in the first mode of the double-winding motor driving device according to the one embodiment of the present invention. FIG. 4 is a graph showing current vectors in the second mode of the double-winding motor driving device according to the one embodiment of the present invention.

In FIG. 2, three-phase currents of the inverter Inv1 are represented by Iu, Iv and Iw, and three-phase currents of the inverter Inv2 are represented by Iu*, Iv* and Iw*. Also, a current flowing through the neutral point NP is represented by In.

Figure 3:
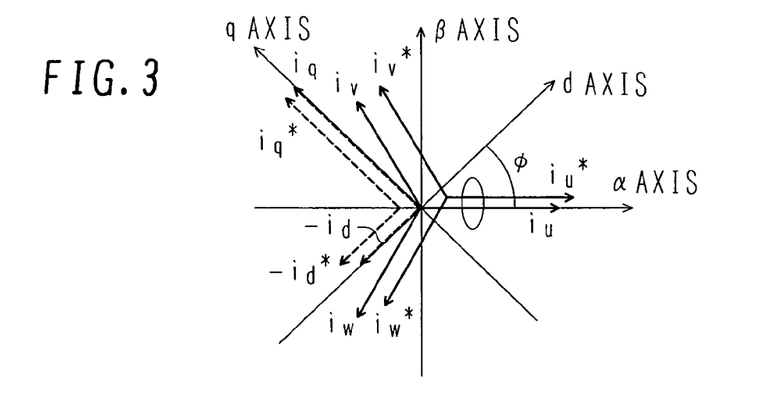
FIG. 3 is a graph showing current vectors in a first mode of the double-winding motor driving device according to the one embodiment of the present invention.

In the graph of FIG. 3 showing current vectors in the first mode, an α-axis and a β-axis represent a stationary coordinate system when three-phase currents are subjected to two-phase conversion. A d-axis having a phase difference φ with respect to the α-axis and a q-axis perpendicular to the d-axis represent a rotating coordinate system after the two-phase conversion. Since the three-phase to two-phase conversion, the stationary coordinate system, and the rotating coordinate system are well known in the field of motor control, a description thereof is omitted here.

The first mode shown in FIG. 3 is a mode that is selected when the speed of the motor 1 is relatively low and the induced voltage is smaller than the voltage of the high-voltage battery VB. In the first mode, the switch unit S1 is turned on and the switch unit S2 is turned off in response to signals from the microcomputer CPU. Also, the microcomputer CPU controls the rotating coordinate-system currents Iq and Id of the inverter Inv1 and the rotating coordinate-system currents Iq* and Id* of the inverter Inv2 to be held in the same phase.

Herein, by controlling current command values to be the same for the rotating coordinate-system current Iq and the rotating coordinate-system current Iq* and for the rotating coordinate-system current Id and the rotating coordinate-system current Id*, the inverter Inv1 and the inverter Inv2 perform even parallel operations such that the current required by the motor 1 is borne by the two inverters Inv1 and Inv2 half and half. If the switching device IGBT of the inverter Inv1 is heated to an excessively high temperature for some reason, the current of the inverter Inv1 is reduced and the current of the inverter Inv2 is conversely increased, thus holding each of the rotating coordinate-system current (Iq+Iq*) and the rotating coordinate-system currents (Id+Id*) at a predetermined value. In other words, the current can be borne in an adjustable manner by using the two inverters. Particularly, the control is performed so as to make thermal stress evenly imposed on the two inverters. Note that, in the vector graph of FIG. 3, the rotating coordinate-system current Id and the rotating coordinate-system current Id* are each given with a minus sign to indicate a state where field weakening is effectuated. In the first mode, however, because the speed is low, the rotating coordinate-system current Id and the rotating coordinate-system current Id* are smaller than the rotating coordinate-system current Iq and the rotating coordinate-system current Iq*.

In practice, the microcomputer CPU executes processing as follows. The microcomputer CPU calculates the gate signals applied to the inverters Inv1 and Inv2 by using, as feedback information, the detected currents Iu and Iv and the detected currents Iu*, Iv* and Iw* from the current sensors, as well as the output of the voltage sensor V_sence. Then, the microcomputer CPU sends, as the gate signals, the calculated results to the respective IGBTs of the inverters Inv1 and Inv2 through the photocoupler Pc and the driver boards GD1 and GD2.

Figure 4:
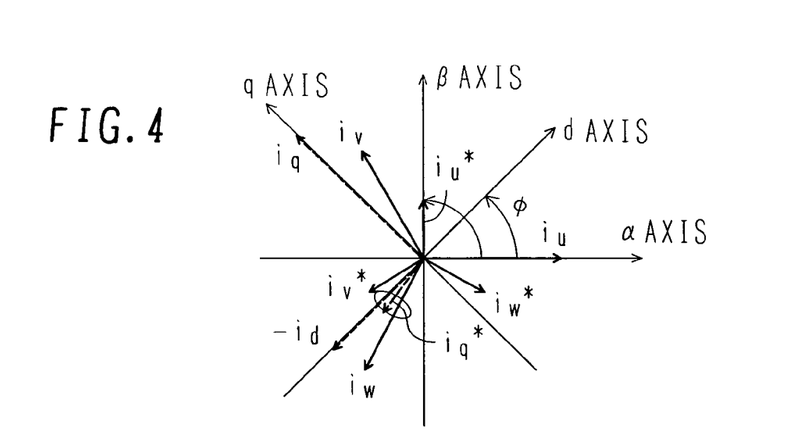
FIG. 4 is a graph showing current vectors in a second mode of the double-winding motor driving device according to the one embodiment of the present invention.

The second mode shown in FIG. 4 is a mode that is selected when the speed of the motor 1 is relatively high and the induced voltage is higher than the voltage of the high-voltage battery VB. In the second mode, the switch unit S1 is turned off and the switch unit S2 is turned on in response to signals from the microcomputer CPU. Also, the microcomputer CPU superimposes a DC component (current) on each of the currents Iu*, Iv* and Iw* of the inverter Inv2 such that the inverter Inv2 is used for boosting the voltage. Assuming that the output of the motor 1 is Pout, the efficiency of the motor and the circuit is η, the voltage of the capacitor Cf after the boosting is Vcf, the effective value of the motor current is Im, the current flowing through the neutral point is In, and the voltage of the high-voltage battery VB is VB, the required DC current is obtained from:

$$Pout/\eta = Vcf \cdot Im = VB \cdot In$$

Namely, (In/3) resulting from evenly dividing the neutral point current In into the three windings U*, V* and W* is the DC current to be superimposed per phase. The DC current does not cause a rotating magnetic field, and therefore it does not appear in the vector graph of FIG. 4. In addition to (In/3) resulting from evenly division of In, AC currents iu*, iv* and iw* (herein a small letter i, such as iu*, represents an AC current alone and a capital letter I, such as Iu*, represents a resultant current added with a DC component) are also caused to flow through the windings U*, V* and W* per phase. On that occasion, the essential feature is that, as shown in FIG. 4, the phases of the AC currents iu*, iv* and iw* are changed 90° from the phases of AC currents iu, iv and iw of the inverter Inv1, thus causing the current Iq* to have the same vector component as the current Id when expressed on the rotating coordinate system. Incidentally, the current Id* is not shown in FIG. 4. This means that the Id* component is zero.

Waveforms of the three-phase currents in the double-winding motor driving device according to this embodiment will be described below with reference to FIG. 5.

Figure 5:
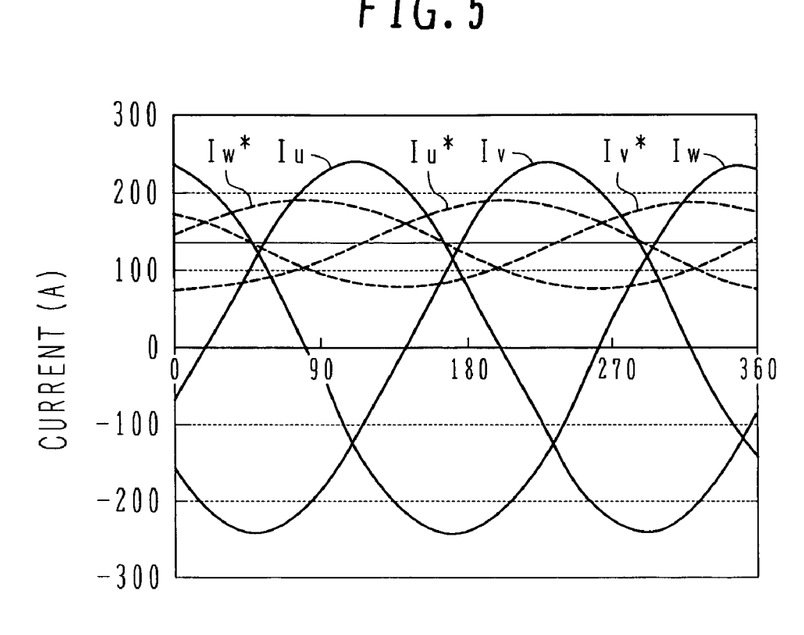
FIG. 5 is a chart showing waveforms of three-phase currents in the double-winding motor driving device according to the one embodiment of the present invention.

FIG. 5 is a chart showing the waveforms of three-phase currents in the double-winding motor driving device according to the one embodiment of the present invention.

More specifically, FIG. 5 shows the waveforms of the three-phase currents Iu, Iv and Iw of the inverter Inv1 and the waveforms of the three-phase currents Iu*, Iv* and Iw* (each given as a resultant value of a DC component an AC component) of the inverter Inv2. From the shown waveforms of the currents of both the inverters, the differences in phase among those currents can be confirmed.

In the example of FIG. 4, the motor 1 is driven by the current Iq and the current (Id+iq*). Stated another way, in consideration of an increase of the induced voltage, the field weakening control is performed in combination with the boosting control. The above-mentioned phase difference is not limited to 90°, and it is desirably set to ±90°×n (n is 0 or 1) when the first and second sets of three-phase windings are wound over the same tooth (or in the same slot) of the stator. Here, n=0 represents the case where the resultant current components are given by (Iq+iq*) and Id. That case corresponds to the degree of the field weakening control being set to be not so large. If the first and second sets of three-phase windings are given with an electrical phase θ due to mechanical arrangement, the above-mentioned phase difference can be set to ±90°×n±θ (n is 0 or 1).

Changing the phases of the AC currents iu*, iv* and iw* of the inverter Inv2 relative to those of the inverter Inv1 in such a manner (hereinafter referred to as "phase compensation") is important for the purpose of properly combining rotating magnetic fields formed by the currents outputted from both the inverters. If the phases are not properly set, the magnetic fields formed by the AC current components from the inverter Inv2 weaken the rotating magnetic fields formed by the AC current components from the inverter Inv1. Therefore, even when currents are caused to flow through the windings, desired torque cannot be obtained, thus resulting in a decrease of efficiency. The current phases of the inverters Inv1 and Inv2 are calculated from the pole position detected signal Psig by the microcomputer CPU shown in FIG. 1.

The advantage obtained with the example of FIG. 4 in which the motor 1 is driven by the current Iq and the current (Id+Iq*) resides in properly adjusting losses in the inverters Inv1 and Inv2, and that point will be described later. The current iq* is desirably set to be smaller in effective value than the current Iq and the current Id (i.e., an effective value of the combined current) of the inverter Inv1. A current passage ratio in PWM control of the inverter Inv2 is required to satisfy the above-mentioned control of adjusting the DC current component to (In/3) and the control of adjusting the current iq* as the AC current component. The state of the current passage ratio being 50% means a condition at which the AC current component is made zero. Taking into account the control of adjusting the current iq* in addition, the current passage ratio is higher than 50% under a condition that the AC sine wave is positive, and it is conversely lower than 50% under a condition that the AC sine wave is negative. Although averaged when looking at one cycle of the sine wave, there occur a pulsating component (ripple) on the boosted voltage and a thermal stress because the values of the currents flowing through the IGBTs of the inverter Inv2 are increased in proportion to the current passage ratio. In order to suppress those problems, it is important to decide the effective value of the current iq* so that the losses in the inverters Inv1 and Inv2 are made appropriate and the above-mentioned voltage ripple is suppressed at the same time.

The construction of a switching device module used in the double-winding motor driving device according to this embodiment will be described below with reference to FIG. 6.

Figure 6A:
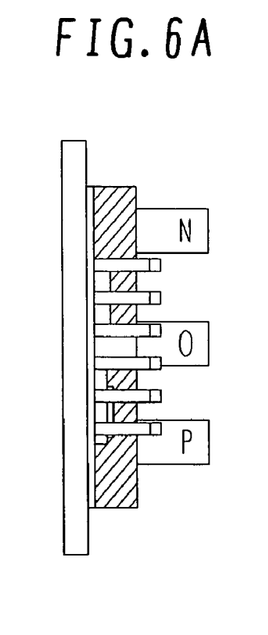
FIGS. 6A and 6B are each a schematic view showing the construction of a switching device module used in the double-winding motor driving device according to the one embodiment of the present invention.
Figure 6B:
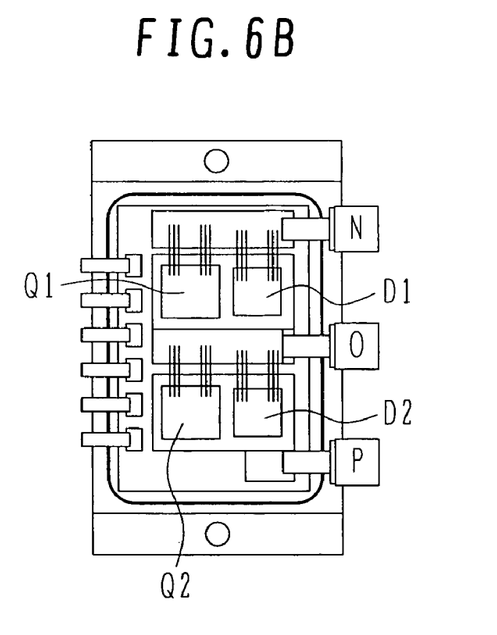

FIG. 6 shows the construction of the switching device module used in the double-winding motor driving device according to the one embodiment of the present invention. Specifically, FIG. 6A is a side view and FIG. 6B is a plan view.

FIGS. 6A and 6B show a module structure for the IGBTs used in the inverter Inv1, the inverter Inv2, and the switch units S1 and S2. The following description is made of, by way of example, a module for the U-phase arm of the inverter Inv1. Switching devices Q1 and Q2 and diodes D1 and D2 connected in the half-bridge form for one phase are mounted on a substrate to constitute one module which is generally called 2-in-1 module. A positive terminal N, a negative terminal P, and an output terminal O each formed of a wide conductor are mounted to the substrate, and respective terminals of the switching devices Q1 and Q2 and the diodes D1 and D2 are connected to the terminals N, P and O by bonding with a plurality of aluminum wires. Respective ends of the positive terminal N, the negative terminal P, and the output terminal O are externally led out to serve as terminals for connection to the exterior. The incorporated power devices are resin-molded together with a wiring board inside the module.

The inverter Inv1, the inverter Inv2, and the switch units S1 and S2 are each constituted by using the above-mentioned module as a basic unit. Because this embodiment is featured in making appropriate the losses of the inverter Inv1 and the inverter Inv2 as described above, the current ratings of the inverter Inv1 and the inverter Inv2 are substantially the same.

Also, by handling the switch units S1 and S2 such that the switch unit S1 is positioned in the higher potential side and the switch unit S2 is positioned in the lower potential side, one set of the switch unit S1 and the switch unit S2 can be constituted by the basic module shown in FIG. 6. Incidentally, since the switch unit S1 and the switch unit S2 allow passage of the currents supplied to the inverter Inv1 and the inverter Inv2, respectively, each switch unit is desirably constituted by connecting a plurality of basic modules in parallel depending on the required current rating.

Thus, with this embodiment, all the IGBTs can be constituted by using an integer number of the basic module shown in FIG. 6, and a cost reduction is also realized as a result of standardization.

The control operation of the double-winding motor driving device according to this embodiment will be described below with reference to FIG. 7.

Figure 7:
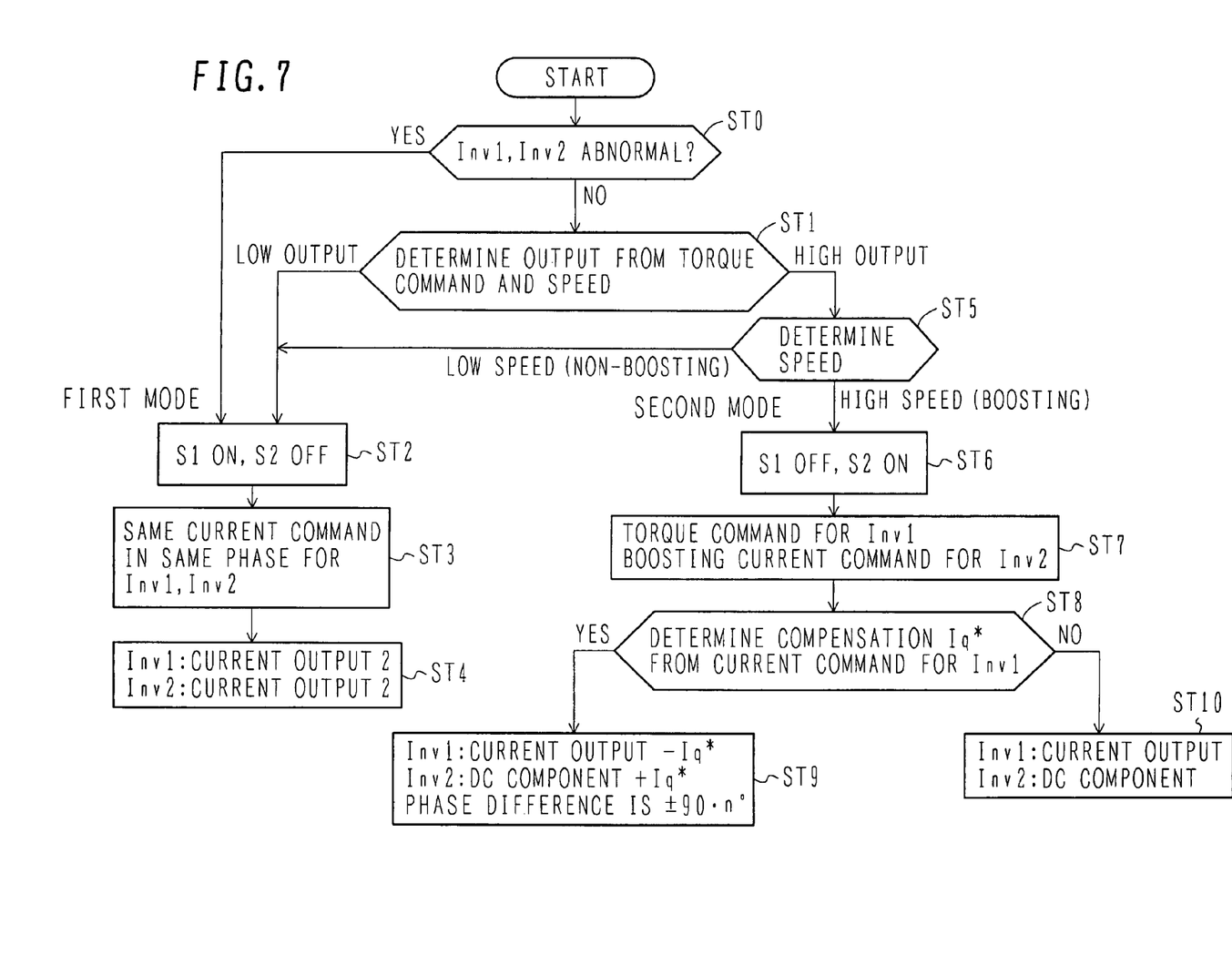
FIG. 7 is a flowchart showing control operation of the double-winding motor driving device according to the one embodiment of the present invention.

FIG. 7 is a flowchart showing the control operation of the double-winding motor driving device according to the one embodiment of the present invention.

In step ST0 of FIG. 7, the microcomputer CPU determines the presence or absence of an abnormal condition in each of the inverters Inv1 and Inv2. If there is any abnormal condition, the microcomputer CPU proceeds to step ST2. Processing to be executed in that case will be described later.

Then, in step ST1, the microcomputer CPU obtains the output of the motor 1 based on the torque command value for the motor 1 and the rotation speed of the motor 1, and determines whether the motor output is high or low. Here, the rotation speed is decided in consideration of the vehicle speed and a ratio of a speed reduction gear disposed between an output shaft of the motor and wheels.

If the determination result in step ST1 shows that the motor output is low and the motor current is small, the microcomputer CPU proceeds to step ST2. On the other hand, if the determination result of step ST1 shows that the motor output is high and the motor current is large, the microcomputer CPU proceeds to step ST5 and determines the rotation speed. In the case of the low speed, the microcomputer CPU proceeds to step ST2, and in the case of the high speed, it proceeds to step ST6.

In step ST2, the microcomputer CPU selects the first mode, thus turning on the switch unit S1 and turning off the switch unit S2.

Then, in step ST3, the microcomputer CPU commands the inverters Inv1 and Inv2 to flow the same current in the same phase. In step ST4, the inverters Inv1 and Inv2 output the demanded current in parallel operation.

On the other hand, if the high output and the high speed are determined in step ST5, the microcomputer CPU selects the second mode in step ST6, thus turning off the switch unit S1 and turning on the switch unit S2.

Then, in step ST7, the microcomputer CPU issues a current command to the inverter Inv1 for driving the motor 1, and issues a command to the inverter Inv2 to flow a DC current through the neutral point NP for boosting the battery voltage VB.

Then, in step ST8, the microcomputer CPU determines whether an AC current for compensation, which is changed in phase as described above, is to be superimposed on the DC current from the inverter Inv2. If the determination result is Yes, the microcomputer CPU proceeds to step ST9, and if it is No, the microcomputer CPU proceeds to step ST10.

In step ST9, the inverter Inv2 outputs a current resulting from superimposing a DC current component and an AC current component iq* having been changed in phase, and the inverter Inv1 outputs a current resulting from subtracting the AC current component iq* having been changed in phase from the current which has been commanded in step ST7. That process enables current allocation to both the inverters to be performed as described later.

In step ST10, the inverter Inv1 outputs the current commanded in step ST7 and the inverter Inv2 outputs the DC current.

When regenerative braking is performed on the motor 1, the current commands in steps ST4, ST9 and ST10 are changed to be negative. In the case of ST4, for example, currents flow from the motor 1 into the switch unit S1 through the inverters Inv1 and Inv2 such that the currents are returned from the switch unit S1 to the high-voltage battery VB in a regenerative manner.

In the case of step ST9, the current command for the inverter Inv1 is also changed to be negative. At the same time, the phase of the AC current component for the inverter Inv2 is changed so as to maintain the relationship that the current id and the current id* in FIG. 4 are held in the same phase.

If an abnormal condition is detected in any one of the inverters Inv1 and Inv2, the microcomputer CPU in step ST0 selects the first mode in step ST2 regardless of the output and the speed of the motor 1, thereby enabling the operation of the other sound inverter to be continued in accordance with the steps shown in FIG. 7 subsequent to step ST2. With that process, although the motor 1 cannot produce the intended torque, the driving of the motor can be continued with the presence of the sound inverter, and shutdown of the entire system can be avoided. In an ordinary inverter, because a power section is constituted in a single-system structure, it is impossible to continue the driving of the motor in the event of an abnormal condition. In contrast, with this embodiment, the presence of the inverter Inv2, which is provided for the purpose of boosting the voltage, ensures redundancy in the event of an abnormal condition.

The operation in control of the double-winding motor driving device according to this embodiment will be described below with reference to FIGS. 8-10.

Figure 8:
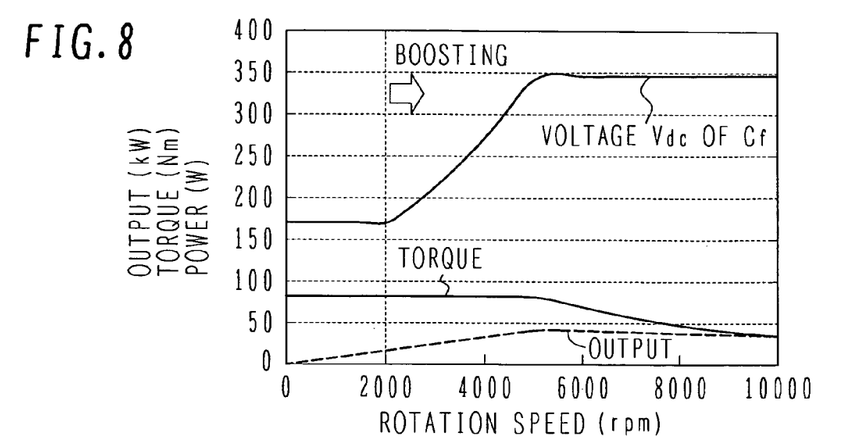
FIG. 8 is a graph for explaining the operation in control of the double-winding motor driving device according to the one embodiment of the present invention.
Figure 9:
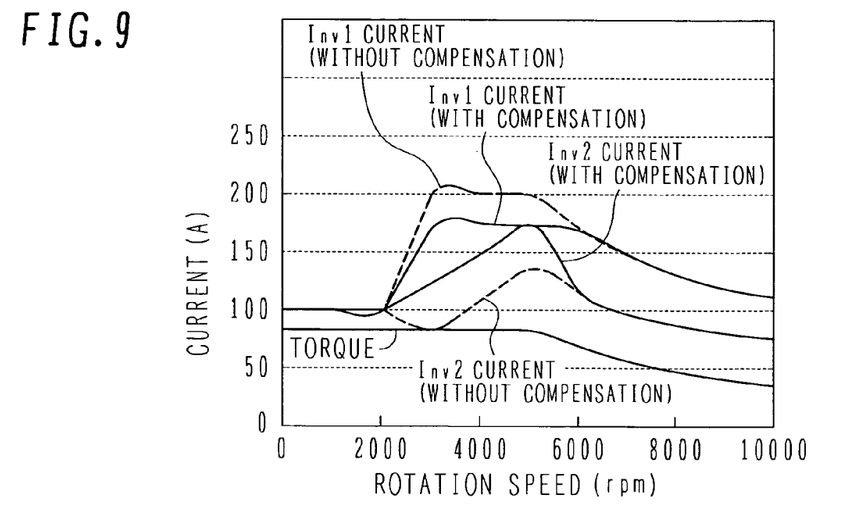
FIG. 9 is a graph for explaining the operation in control of the double-winding motor driving device according to the one embodiment of the present invention.
Figure 10:
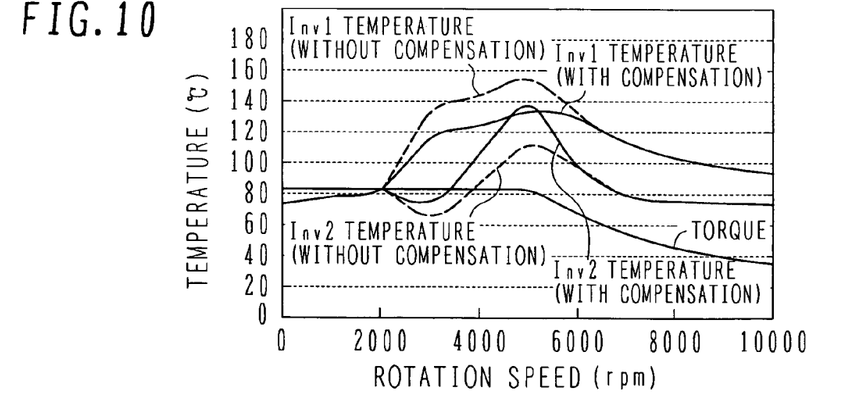
FIG. 10 is a graph for explaining the operation in control of the double-winding motor driving device according to the one embodiment of the present invention.

FIGS. 8 to 10 are graphs for explaining the operation in control of the double-winding motor driving device according to the one embodiment of the present invention.

FIG. 8 is a graph showing the torque, the output, and the voltage Vdc of capacitor Cf with respect to the rotation speed of the motor 1. The vertical axis of FIG. 8 represents the torque (Nm), the output (kW), and the voltage (V) of capacitor Cf. Numerals indicated by the vertical axis are common to all those parameters, but they differ from each other in unit.

In an example shown in FIG. 8, the boosting is performed in a speed range over 2,000 rpm to increase Vdc in proportion to the rotation speed. Correspondingly, the output (kW) and the torque (Nm) are changed as shown.

FIG. 9 shows currents of the inverter Inv1 and the inverter Inv2 under the conditions shown in FIG. 8. In FIG. 9, solid lines represent the case of performing, in the above-described step ST9, the compensation to superimpose the AC current on the DC current outputted from the inverter Inv2 in the range of the rotation speed where the boosting is to be performed. Broken lines represent the case of non-compensation where that compensation is not performed and the inverter Inv2 outputs only the DC current. As seen from FIG. 9, the current of the inverter Inv1 in the case with the compensation is reduced from that in the case without the compensation, and conversely the current of the inverter Inv2 in the case with the compensation is increased from that in the case without the compensation. As a result, in the case of performing the compensation in step ST9, the Inv1 current and the Inv2 current become almost equal to each other in their peak values. This means that the motor currents are evenly allocated to the inverter Inv1 and the inverter Inv2.

FIG. 10 is a graph for explaining results of evaluating, by comparison in terms of temperature, the case where the current allocation explained above with reference to FIG. 9 is performed. Specifically, the graph of FIG. 10 represents temperatures (IGBT temperatures) of the inverter Inv1 and the inverter Inv2. Solid lines represent the case in which the compensation is performed as described above, and broken lines represent the case where the compensation is not performed. In the case with the compensation, maximum temperatures of the inverter Inv1 and the inverter Inv2 are almost equal to each other. In the case without the compensation, however, the temperature of the inverter Inv1 becomes higher than that of the inverter Inv2 by about 40° C. Generally, a power device has an upper limit in temperature in use, and many types of IGBTs are handled while a maximum temperature is set to 150° C. Stated another way, in the example shown in FIG. 10, the temperature of the inverter Inv1 exceeds the maximum temperature in the case without the compensation, and an abnormality avoiding action to stop the operation of the inverter Inv1 is required to protect the power device. On other hand, in the case with the compensation, the maximum temperatures of the inverter Inv1 and the inverter Inv2 are both held under the upper limit for the power device. Accordingly, the inverter Inv1 and the inverter Inv2 can continue the normal operation while maintaining the same motor output.

Thus, with this embodiment, it is possible to properly allocate the currents of the inverter Inv1 and the inverter Inv2 or the losses due to the currents, and to make those two inverters generate heat evenly.

Operating waveforms in the PWM control of the inverter Inv1 and the inverter Inv2 in the double-winding motor driving device according to this embodiment will be described below with reference to FIG. 11.

Figure 11:
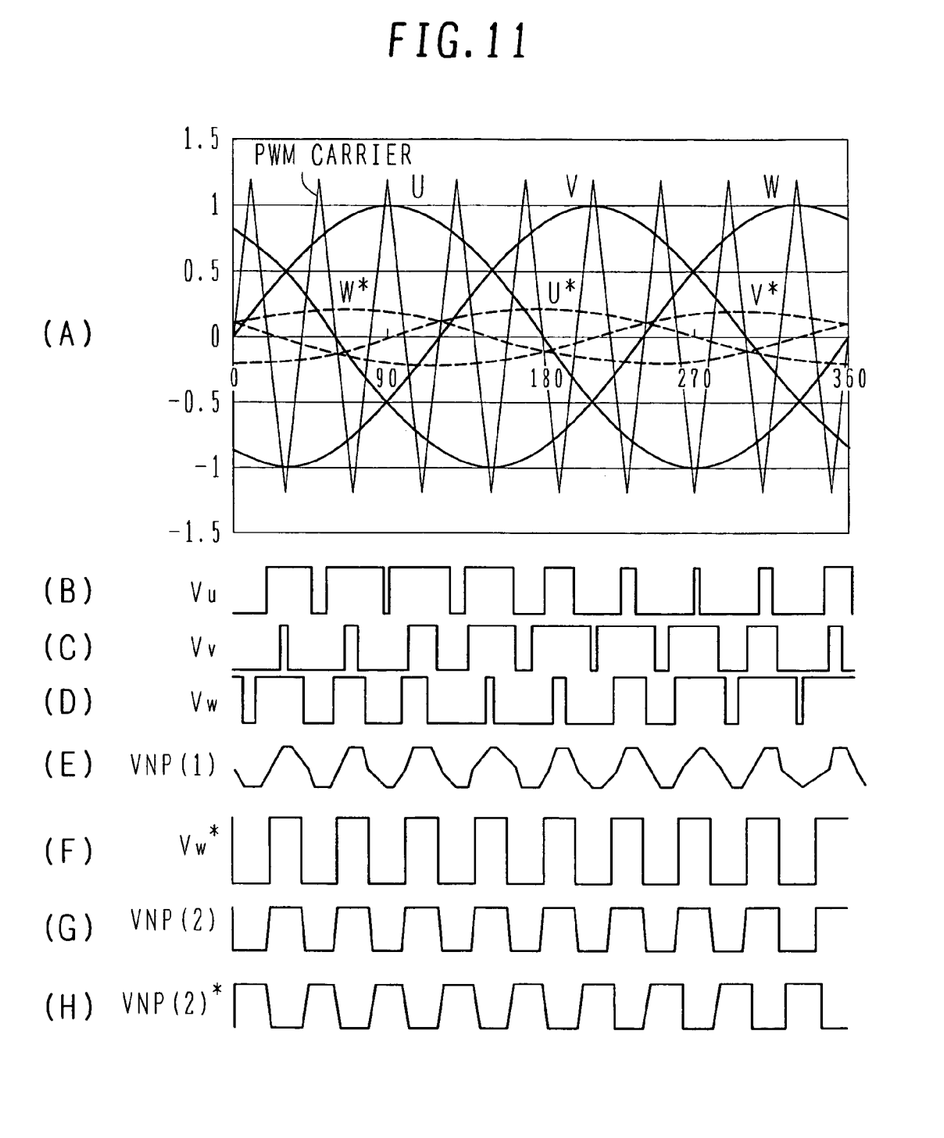
FIG. 11 is a chart showing operating waveforms in PWM control of an inverter Inv1 and an inverter Inv2 in the double-winding motor driving device according to the one embodiment of the present invention.

FIG. 11 is a chart showing the operating waveforms in PWM control of the inverter Inv1 and the inverter Inv2 in the double-winding motor driving device according to the one embodiment of the present invention. In the chart of FIG. 11, the horizontal axis represents time. The vertical axis of FIG. 11A represents the voltage command value in each phase and a PWM carrier. FIGS. 11B-11D represent the output voltages of the inverter Inv1 in the respective phases. FIG. 11E represents the voltage at the neutral point where the motor windings of the U, V and W phases are connected to each other. FIG. 11F represents the output voltage of the inverter Inv2 in the U phase. FIG. 11G represents the voltage at the neutral point where the motor windings of the U*, V* and W* phases are connected to each other. FIG. 11H represents the waveform obtained by reversing the phase of the waveform shown in FIG. 11G.

More specifically, in FIG. 11A, U, V and W represent the voltage command values in the respective phases, which are calculated in the CPU for the inverter Inv1. Likewise, U*, V* and W* represent the voltage command values used when the inverter Inv2 is operated in the second mode. Also, the PWM carrier is a signal that is used in calculation executed by the CPU to make comparison with the voltage command values for the inverter Inv1 and the inverter Inv2 and to produce the gate signals for the IGBTs of each inverter. A method of comparing the voltage command value in the sine wave form with a PWM carrier signal in the triangular form is generally known, and therefore a description of the method is omitted here.

FIGS. 11B-11D represent, by Vu, Vv and Vw, the output voltages of the inverter Inv1 in the respective phases, which are resulted from the above-described PWM control. In FIG. 11B, a high level of the output voltage Vu represents the state where a voltage equal to the voltage of the capacitor Cf is outputted from the U-phase arm of the inverter Inv1 to the motor. Also, a low level of the output voltage Vu represents the state where the U-phase output of the inverter Inv1 is zero, namely, it is almost equal to the negative voltage of the capacitor Cf.

The voltage at the neutral point where the U, V and W windings of the motor 1 are connected to each other is a value resulting from combining the output voltages Vu, Vv and Vw with each other. FIG. 11E represents a voltage VNP(1) at the neutral point. A maximum value of the voltage VNP(1) at the neutral point is a high voltage that is almost equal to the voltage value of the capacitor Cf. It is understood that fluctuations in the voltage at the neutral point cause displacement currents to flow in leakage capacitances which are parasitic to the windings of the motor 1, the harness connecting the output terminals of the inverter Inv1 and the windings of the motor 1 to each other, and the IGBTs of the inverter Inv1. Those displacement currents and higher-harmonic components thereof generate electromagnetic noises.

The feature of this embodiment also resides in reducing the electromagnetic noise, which is caused with fluctuations in the voltage at the neutral point, based on a PWM control method for the inverter Inv1 and the inverter Inv2. FIG. 11F represents the output voltage Vu* of the inverter Inv2 in the U* phase. The output voltages in the V* and W* phases are omitted.

FIG. 11G represents a voltage VNP(2) at the neutral point where the windings U*, V* and W* of the motor 1 are connected to each other. In FIG. 11G, hills and valleys of the waveform representing the neutral point voltage VNP(2) are in the same phase as those of the waveform representing the neutral point voltage VNP(1). In that state, the displacement current caused in one inverter flows about twice due to the fluctuations in the voltage at each of both the neutral points. In this embodiment, however, when the gate signals are produced for the inverter Inv2 by comparing the voltage command values U*, V* and W* with the PWM carrier, the logic is reversed from that in the case of the inverter Inv1.

FIG. 11H represents a phase-reversed neutral point voltage VNP(2)* which is resulted from reversing the logic of VNP (2) (namely, making VNP(2) reversed in phase). By thus reversing the logic, hills and valleys of the waveform representing the phase-reversed neutral point voltage VNP(2)* are reversed in phase from those of the waveform representing the neutral point voltage VNP(1). Therefore, the displacement currents caused by the leakage capacitances due to fluctuations in the respective voltages are also reversed in positive and negative signs, and they cancel each other. In the case of ordinary parallel inverters, because outputs of two inverters are electrically connected, the two inverters are short-circuited and fail to operate if PWM signals for the two inverters are reversed in phase. In contrast, with this embodiment, the outputs of the two inverters are not electrically connected in common and are magnetically coupled to each other in parallel through the respective motor windings. Accordingly, the PWM signals for the two inverters can be reversed in phase without problems. Thus, by executing the PWM control method for the inverter Inv2 in phase reversed from that for the inverter Inv1, the electromagnetic noise caused with the displacement currents can be reduced.

The construction of an automobile in which is mounted the double-winding motor driving device according to this embodiment will be described below with reference to FIG. 12.

Figure 12:
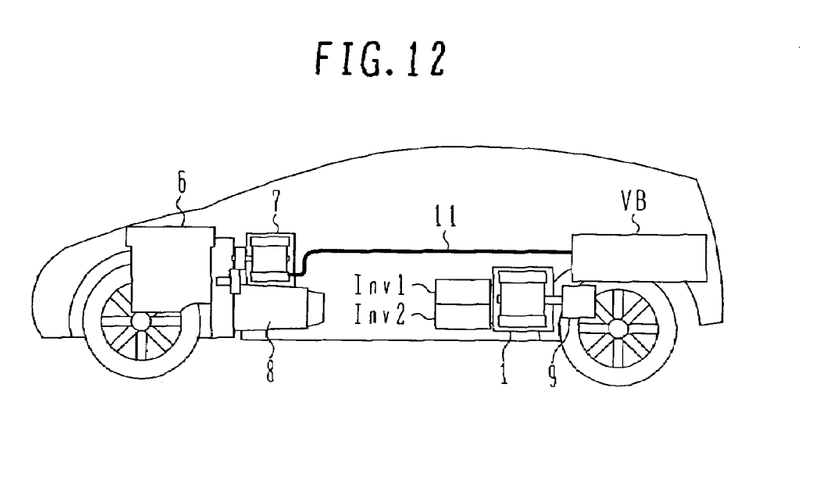
FIG. 12 is a schematic view showing the construction of an automobile in which is mounted the double-winding motor driving device according to the one embodiment of the present invention.

FIG. 12 is a schematic view showing the construction of an automobile in which is mounted the double-winding motor driving device according to the one embodiment of the present invention. Note that, in FIG. 12, the same characters as those in FIG. 1 denote the same components.

An automobile 10 includes an engine 6. A driving force of the engine 6 is transmitted to front wheels for driving the front wheels after speed change by a transmission 8. A generator 7 is driven by utilizing a part of the output of the engine 6, to thereby generate electric power. An output voltage of the generator 7 is higher than that of an ordinary generator for an automobile. A current generated by the generator 7 is supplied via a harness 11 to a secondary battery VB mounted in a rear portion of the automobile and is charged in the secondary battery VB. A voltage of the secondary battery VB is supplied to two inverters Inv1 and Inv2, and these two inverters Inv1 and Inv2 drive a double-winding motor 1. A driving force of the motor 1 is transmitted to rear wheels through a differential gear 9, thereby driving the rear wheels. The construction of the automobile is illustrated merely by way of example, and the automobile can be of any other suitable construction.

Characteristics of the double-winding motor 1 driven by the double-winding motor driving device according to this embodiment will be described below with reference to FIG. 13.

Figure 13:
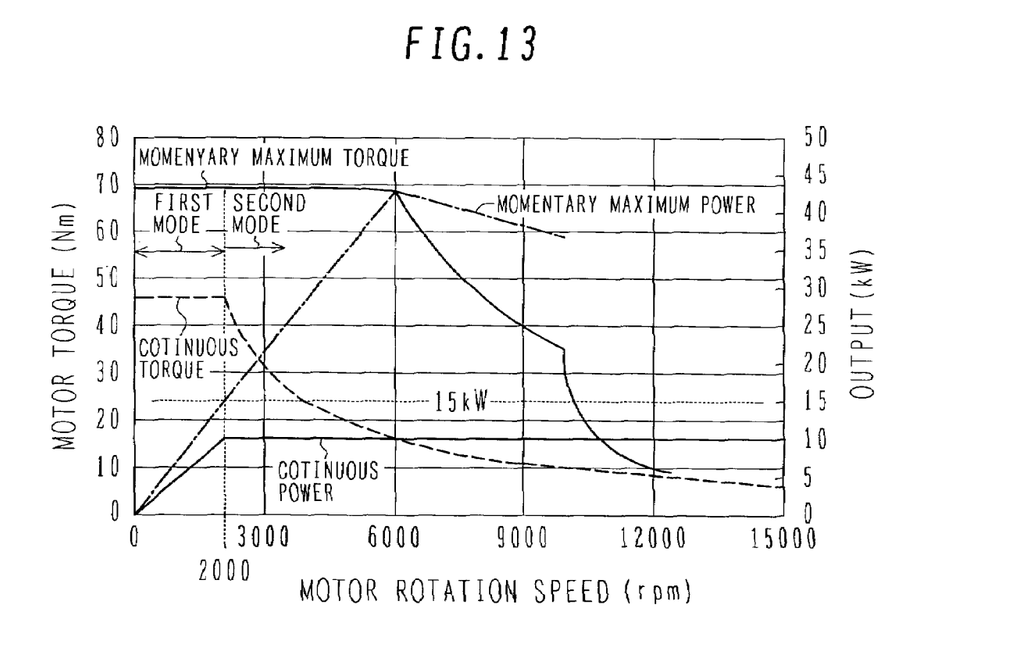
FIG. 13 is a characteristic graph of a double-winding motor driven by the double-winding motor driving device according to the one embodiment of the present invention.

FIG. 13 is a characteristic graph of the double-winding motor 1 driven by the double-winding motor driving device according to the one embodiment of the present invention.

The horizontal axis of FIG. 13 represents the rotation speed (rpm) of the motor 1, and the vertical axis represents the torque (Nm) and the output (kW) of the motor 1. The characteristics shown in FIG. 13 represent values of those parameters obtained when the motor is controlled in accordance with the flowchart shown in FIG. 7. "Continuous torque" and "continuous power" in FIG. 13 correspond to the low output in FIG. 7, and the inverters Inv1 and Inv2 are operated in the first mode. Also, "momentary maximum torque" and "momentary maximum power" in FIG. 13 correspond to the high output in FIG. 7, and the voltage is boosted by the inverter Inv2 in the second mode in the high rotation speed range (over 2000 rpm in FIG. 13).

In this embodiment, when the automobile shown in FIG. 12 runs in a cruising way, the motor 1 supplies the continuous torque shown in FIG. 13. Also, when the automobile passes another vehicle at high speed, or when the automobile produces a high output in a short time for the necessity of running control, the motor 1 is controlled to generate the momentary maximum torque shown in FIG. 13.

In this embodiment, as described above with reference to FIGS. 9 and 10, the currents of the inverter Inv1 and the inverter Inv2 are properly adjusted such that the losses are evenly distributed. By employing that feature, therefore, the high output can be produced within the allowable range of maximum temperature of the IGBTs of the inverter Inv1 and the inverter Inv2 even when the momentary maximum torque shown in FIG. 13 is generated.

The reason why the double-winding motor driving device according to this embodiment is provided for driving the rear wheels in the example shown in FIG. 12 is to momentarily generate high torque at the rear wheels and to compensate the running control, thereby ensuring stability of the vehicle even when the front wheels slip while the automobile is running at high speed. However, the application is not limited to that example, and the present invention is also applicable to the case where the double-winding motor driving device is provided for driving the front wheels with the view of momentarily assisting engine torque.

According to this embodiment, as described above, in the boosting-type motor driving device using no reactor, the boosting operation and the motor driving can be controlled at the same time, and the losses in the power devices of the inverters can be properly distributed.

Also, since the currents of the power devices (IGBTs) of the inverters are properly adjusted, a temperature rise can be reduced.

Further, the electromagnetic noise can be suppressed.

In addition, the motor can continue the operation even in the event of an abnormal condition.

What is claimed is:

1. A motor driving device for driving a motor with a double-winding structure having a first set of three-phase windings and a second set of three-phase windings which are wound over a stator, said motor driving device including first and second inverters which are connected respectively to said first and second sets of three-phase windings, and controlling said first and second inverters to control a driving force of said motor with the double-winding structure, wherein said first and second inverters have positive and negative terminals which are connected respectively in common to a high-voltage battery, and said motor driving device further includes first switch means connected between the positive terminals of said first and second inverters connected in common and a positive pole of said high-voltage battery; and second switch means connected between a neutral point of said second set of three-phase windings and the positive pole of said high-voltage battery.

2. The motor driving device according to claim 1, further comprising control means for commanding said first and second inverters to output AC currents in the same phase in a first mode in which said first switch means is turned on and said second switch means is turned off, and commanding said first inverter to output a desired AC current, commanding said second inverter to flow a DC current via said neutral point, and for commanding said first and second inverters to superimpose AC currents, which are changed in phase for compensation, in a second mode in which said first switch means is turned off and said second switch means is turned on.

3. The motor driving device according to claim 2, wherein said control means performs vector control for each of said first and second inverters such that, in the first mode, q- and d-axis AC currents outputted from said first and second inverters are in the same phase, and that, in the second mode, the phase of a q-axis AC current outputted from said first inverter is changed by $-90°\times n$ (n is 0 or 1) for compensation and the phase of a q-axis AC current outputted from said second inverter is changed by $+90°\times n$ (n is 0 or 1) for compensation.

4. The motor driving device according to claim 2, further comprising current sensors for detecting respective output currents of said first and second inverters, wherein said control means changes the amplitude and phase of the AC current outputted from said second inverter in the second mode such that a difference between effective values of the currents outputted from said first and second inverters, which are detected by said current sensors, is reduced.

5. The motor driving device according to claim 2, wherein said control means controls said first and second inverters in a pulse width modulation method such that pulse-like voltages outputted from said first and second inverters are reversed in phase.

6. The motor driving device according to claim 2, wherein when an abnormal condition of one of said first and second inverters in detected, said control means turns on said first switch means, turned off said second switch means, and continues to drive said motor by using the other sound inverter.

7. A motor driving device for driving a motor with a double-winding structure having a first set of three-phase windings and a second set of three-phase windings which are wound over a stator, said motor driving device including first and second inverters which are connected respectively to said first and second sets of three-phase windings, and controlling said first and second inverters to control a driving force of said motor with the double-winding structure, wherein said first and second inverters have positive and negative terminals which are connected respectively in common to a high-voltage battery, and said motor driving device further includes first switch means connected between the positive terminals of said first and second inverters connected in common and a positive pole of said high-voltage battery;

second switch means connected between a neutral point of said second set of three-phase windings and the positive pole of said high-voltage battery; and control means for commanding said first and second inverters to output AC currents in the same phase in a first mode in which said first switch means is turned on and said second switch means is turned off, and for commanding said first inverter to output a desired AC current, commanding said second inverter to flow a DC current via said neutral point, and commanding said first and second inverters to superimpose AC currents, which are changed in phase for compensation, in a second mode in which said first switch means is turned off and said second switch means is turned on.

8. An automobile comprising a motor with a double-winding structure having a first set of three-phase windings and a second set of three-phase winding which are wound over a stator; and a motor driving device including first and second inverters which are connected respectively to said first and second sets of three-phase windings, and controlling said first and second inverters to control a driving force of said motor with the double-winding structure, wherein said first and second inverters have positive and negative terminals which are connected respectively in common to a high-voltage battery, said motor driving device further includes first switch means connected between the positive terminals of said first and second inverters connected in common and a positive pole of said high-voltage battery;

second switch means connected between a neutral point of said second set of three-phase windings and the positive pole of said high-voltage battery; and control means for commanding said first and second inverters to output AC currents in the same phase in a first mode in which said first switch means is turned on and said second switch means is turned off, and for commanding said first inverter to output a desired AC current, commanding said second inverter to flow a DC current via said neutral point, and commanding said first and second inverters to superimpose AC currents, which are changed in phase for compensation, in a second mode in which said first switch means is turned off and said second switch means is turned on; and said motor is driven in a first mode when a speed of said automobile is low, and is driven in a second mode when a speed of said automobile is high.

* * * * *